US010303566B2

(12) United States Patent
Özer et al.

(10) Patent No.: US 10,303,566 B2
(45) Date of Patent: May 28, 2019

(54) APPARATUS AND METHOD FOR CHECKING OUTPUT DATA DURING REDUNDANT EXECUTION OF INSTRUCTIONS

(71) Applicant: ARM LIMITED, Cambridge (GB)

(72) Inventors: Emre Özer, Buckden (GB); Balaji Venu, Cambridge (GB); Xabier Iturbe, Cambridge (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 134 days.

(21) Appl. No.: 15/645,053

(22) Filed: Jul. 10, 2017

(65) Prior Publication Data
US 2019/0012242 A1  Jan. 10, 2019

(51) Int. Cl.
*G06F 11/00* (2006.01)
*G06F 11/16* (2006.01)

(52) U.S. Cl.
CPC ...... *G06F 11/1641* (2013.01); *G06F 11/1629* (2013.01); *G06F 2201/805* (2013.01); *G06F 2201/82* (2013.01)

(58) Field of Classification Search
CPC .......................... G06F 11/1629; G06F 11/1641
See application file for complete search history.

(56) References Cited

U.S. PATENT DOCUMENTS

| 6,105,155 A * | 8/2000 | Cheng ................. G06F 11/1008 714/735 |
| 6,519,730 B1 * | 2/2003 | Ando ................... G06F 11/1407 714/746 |
| 9,417,946 B2 * | 8/2016 | Vilela ................. G06F 11/0763 |
| 2007/0022348 A1 * | 1/2007 | Racunas ............ G06F 11/1641 714/735 |
| 2010/0308867 A1 * | 12/2010 | Takahashi ........ G01R 31/31703 327/1 |
| 2011/0173482 A1 * | 7/2011 | Penton ................ G06F 11/1641 714/2 |
| 2011/0254602 A1 * | 10/2011 | Steiner ................ G06F 11/1679 327/158 |
| 2012/0023389 A1 * | 1/2012 | Brewerton .......... G06F 11/1641 714/820 |

(Continued)

*Primary Examiner* — Joshua P Lottich
(74) *Attorney, Agent, or Firm* — Nixon & Vanderhye P.C.

(57) ABSTRACT

An apparatus and method are provided for checking output data during redundant execution of instructions. The apparatus has first processing circuitry for executing a sequence of instructions and second processing circuitry for redundantly executing the sequence of instructions. Error code generation circuitry is used to generate an error code from the first output data generated by the first processing circuitry. Error checking circuitry then uses that error code to perform an error checking operation on redundant output data from the second processing circuitry. As a result of the error checking operation, the error checking circuitry then generates a comparison indication signal to indicate that the first output data differs from the redundant output data when the error checking operation detects an error. This provides a very efficient mechanism for implicitly comparing the output data from the first processing circuitry and the second processing circuitry during redundant execution.

20 Claims, 9 Drawing Sheets

(56) References Cited

U.S. PATENT DOCUMENTS

| | | | |
|---|---|---|---|
| 2012/0210162 A1* | 8/2012 | Gara | G06F 11/1064 |
| | | | 714/6.1 |
| 2012/0210172 A1* | 8/2012 | Gara | G06F 11/1641 |
| | | | 714/37 |
| 2013/0138993 A1* | 5/2013 | Franklin | G06F 11/1048 |
| | | | 714/2 |
| 2014/0115401 A1* | 4/2014 | Ito | G06F 11/1641 |
| | | | 714/37 |
| 2017/0074930 A1* | 3/2017 | Nayyar | G06F 11/16 |
| 2017/0227981 A1* | 8/2017 | Yuyama | G06F 1/06 |
| 2017/0357557 A1* | 12/2017 | Jain | G06F 11/1604 |

* cited by examiner

APPARATUS AND METHOD FOR CHECKING OUTPUT DATA DURING REDUNDANT EXECUTION OF INSTRUCTIONS

BACKGROUND

The present technique relates to an apparatus and method for checking output data during redundant execution of instructions.

Due to the environments in which data processing systems may operate, components within the data processing system can exhibit faults, and the presence of these faults may result in errors being detected during performance of data processing operations by the data processing system. The faults may for example be caused by radiation or other external events. Considering the example of a storage element, such radiation may result in a particle strike on a bitcell or flip-flop, which can cause a single event upset (SEU) where a single bit of a stored value changes state. Hence, the storage element exhibits a fault, and this can then give rise to an error being detected when the processing circuitry processes data that includes the bit stored in the faulty storage element.

In systems that require robust error detection, it is known to provide for redundant execution of instructions. In particular, one processor may be considered a main processor used to execute a sequence of instructions, whilst another processor can be provided to redundantly execute the same sequence of instructions. Outputs produced by the two processors at various points during execution can then be compared, with an error condition being flagged if the outputs from the two processors differ.

It will often be the case that the two processors will be arranged so that the operation of the redundant processor is delayed by a number of cycles relative to the main processor. This can serve for example to eliminate common-cause faults that could then result in the same errors being exhibited in the output from both processors, which would go undetected due to the outputs being the same. However, this can require a significant amount of output information from the main processor to be maintained until the corresponding output from the redundant processor is available for comparison, and this can have both area and energy consumption implications.

Accordingly it would be desirable to provide a more efficient mechanism for checking output data during redundant execution of instructions.

SUMMARY

In one example configuration, there is provided an apparatus comprising: first processing circuitry to execute a sequence of instructions; second processing circuitry to redundantly execute the sequence of instructions; error code generation circuitry to generate an error code from first output data generated by the first processing circuitry; and error checking circuitry to use the error code to perform an error checking operation on redundant output data from the second processing circuitry, and to generate a comparison indication signal to indicate that the first output data differs from the redundant output data when the error checking operation detects an error.

In another example configuration, there is provided a method of checking output data during redundant execution of instructions within an apparatus having first processing circuitry to execute a sequence of instructions, and second processing circuitry to redundantly execute the sequence of instructions, the method comprising: generating an error code from first output data generated by the first processing circuitry; using the error code to perform an error checking operation on redundant output data from the second processing circuitry; and generating a comparison indication signal to indicate that the first output data differs from the redundant output data when the error checking operation detects an error.

In a yet further example configuration, there is provided an apparatus comprising: first processing means for executing a sequence of instructions; second processing means for redundantly executing the sequence of instructions; error code generation means for generating an error code from first output data generated by the first processing means; and error checking means for using the error code to perform an error checking operation on redundant output data from the second processing means, and for generating a comparison indication signal to indicate that the first output data differs from the redundant output data when the error checking operation detects an error.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
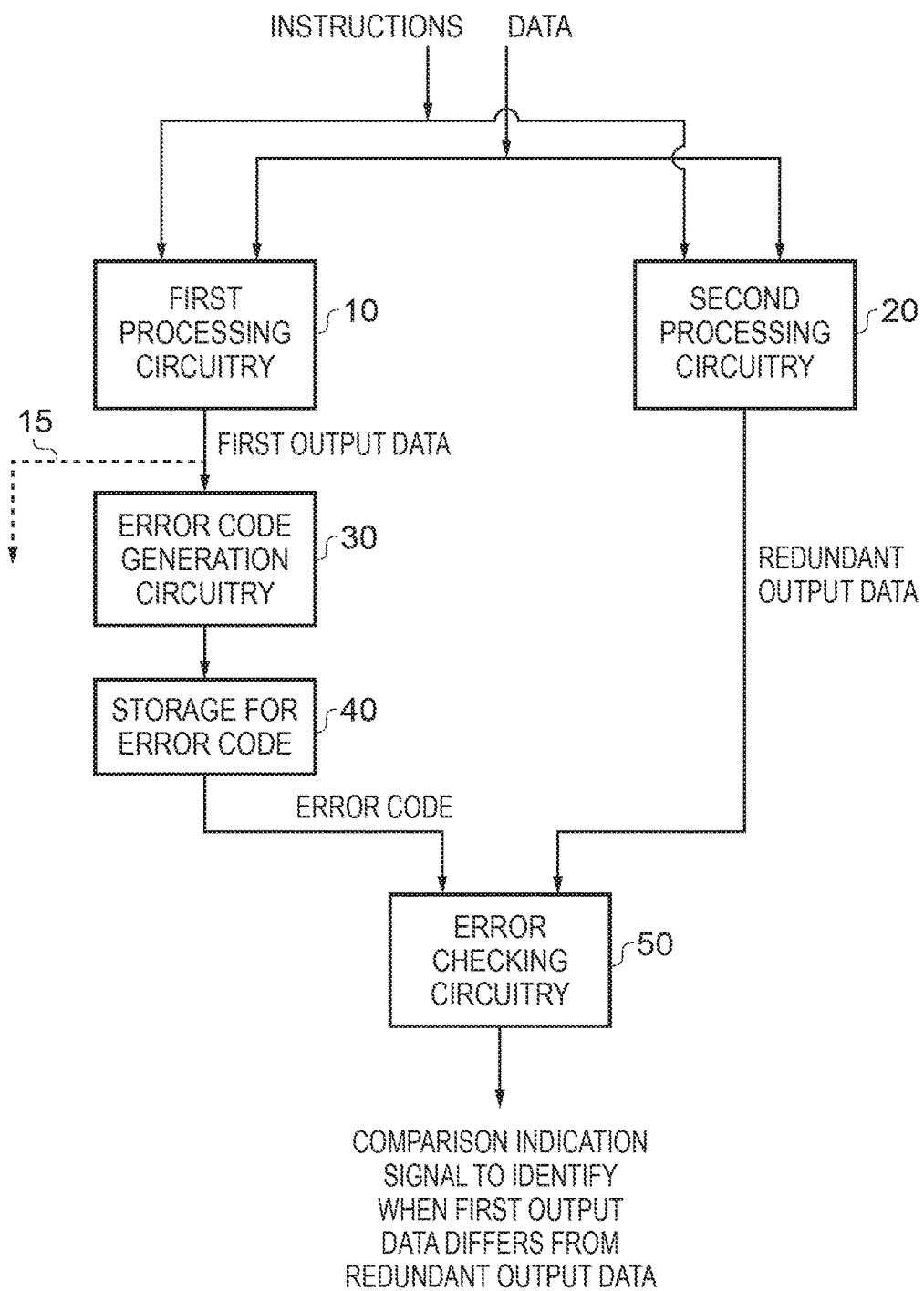
FIG. 1 is a block diagram of an apparatus in accordance with one embodiment.

Before discussing the embodiments with reference to the accompanying figures, the following description of embodiments is provided.

The embodiments described herein have first processing circuitry to execute a sequence of instructions, and second processing circuitry to redundantly execute the sequence of instructions. Error code generation circuitry is arranged to generate an error code from first output data generated by the first processing circuitry.

Error checking circuitry is then arranged to use the error code to perform an error checking operation on redundant output data from the second processing circuitry. As a result of that error checking operation, the error checking circuitry can then generate a comparison indication signal to indicate that the first output data differs from the redundant output data when the error checking operation detects an error.

Typically, an error code may be generated in association with some data, and then passed along with that data, to allow a later check to be performed in respect of that data to check that no error has been introduced into the data since the time the error code was generated. However, the above described technique uses such an error code for a different purpose. In particular, once the error code has been generated from the first output data, it is actually then used to perform an error checking operation on redundant output data from the second processing circuitry. It should be noted that this is not the output data that the error code was generated from. Nevertheless, due to the nature of the redundant execution by the second processing circuitry, there is an expectation that the redundant output data will match the first output data, and hence the use of the error code provides a very efficient mechanism for performing a check of the equality between the redundant output data and the first output data without needing to retain the first output data for that purpose. This can hence give rise to some efficiency gains.

Since the error checking circuitry is using the error code generated from the first output data to perform an error checking operation on different data, namely the redundant output data, if the error checking operation detects an error, this does not necessarily mean that there is an error in the redundant output data, but it can be used to generate a comparison indication signal to indicate that the first output data differs from the redundant output data, i.e. can flag exactly the condition that the use of the redundant execution is seeking to detect.

Accordingly, the above described approach allows for an implicit comparison of the first output data with the redundant output data, but without needing to explicitly provide circuitry to compare the first output data with the redundant output data. Instead the error checking circuitry, by using the error code to perform an error checking operation on the redundant output data, can identify situations where the first output data differs from the redundant output data.

In one embodiment, the error checking circuitry may also be arranged to generate the comparison indication signal to indicate that the first output data is considered to be the same as the redundant output data when the error checking operation detects no error. It will be appreciated that in this scenario it cannot be guaranteed that the first output data is definitely the same as the redundant output data, but instead the result effectively indicates that both the first output data and the redundant output data will produce the same error code. Nevertheless, it has been found that in many practical situations such an approach can pick up a very large proportion of situations where the first output data differs from the redundant output data.

In one embodiment, operation of the second processing circuitry is delayed relative to operation of the first processing circuitry, and the error code generation circuitry is arranged to generate the error code one or more clock cycles before the redundant output data is available to the error checking circuitry, thereby enabling the comparison indication signal to be generated without needing to buffer the first output data for said one or more clock cycles.

It will typically be the case that the error code will comprise significantly less bits than the first output data, and hence less buffer circuitry is required to maintain the error code for one or more error cycles than would be the case if the first output data needed to be buffered merely to allow it to be used to check against the redundant output data. Since less buffer circuitry is required, this can also reduce energy consumption of the apparatus.

In one embodiment, storage is provided to temporarily store the error code until the error checking circuitry performs the error checking operation.

The manner in which the first and second processing circuits operate, and the frequency with which their outputs are compared, can vary depending upon embodiment. In one embodiment, the first processing circuitry and the second processing circuitry are arranged to operate in cycle-by-cycle lockstep, and for each clock cycle for which the second processing circuitry produces redundant output data the error checking circuitry is arranged to perform the error checking operation on said redundant output data using the error code generated from corresponding first output data from the first processing circuitry.

In such an embodiment, a comparison operation is required for every cycle of operation, and the output data that needs to be compared may in some embodiments comprise a large number of signals. Hence, by generating an error code from the first output data and then performing an error checking operation on the redundant output data using that error code, this can significantly reduce the complexity of the checking operation required, by avoiding the needs to check each output signal from the first processing circuit with the corresponding output signal from the second processing circuit.

Further, it is often the case that operation of the second processing circuitry is delayed by one or more cycles relative to operation of the first processing circuitry, for example to eliminate common-cause faults. In such scenarios, the error code can be generated as soon as the first output data is available, so that for the purposes of the checking required with the redundant output data, only the error code needs to be buffered until the redundant output data is available.

In one embodiment, the first output data comprises a plurality of signals grouped into multiple signal categories. In one embodiment, the multiple signal categories include a subset of signal categories whose signals are more likely to exhibit an error on occurrence of a fault than signals of signal categories outside of the subset. By identifying the signal categories that are most likely to give rise to errors, this can lead to enhanced coverage of error situations. In particular, in one embodiment the error code generation circuitry may be arranged to isolate the signals from each of the signal categories in the subset of signal categories when generating the error code. By such an approach, this increases the likelihood that, when the first output data does in fact differ from the redundant output data, the use of the error code generated from the first output data when performing the error checking operation on the redundant output data will in fact result in the detection of an error, and hence the generation of a comparison indication signal indicating that the first output data differs from the redundant output data.

The error code generation circuitry can take a variety of forms, but in one embodiment comprises a plurality of parity bit generators, each parity bit generator arranged to receive signals of the first output data from more than one signal category that comprises at most one of the subset of signal categories. Hence, each parity bit generator will not receive signals of the first output data that are associated with multiple signal categories of the subset that are more likely to exhibit errors. This can serve to isolate the signals from each of the signal categories in that subset when generating the error code.

In one particular embodiment, the plurality of parity bit generators comprises N parity bit generators, where N is the total number of signals in said subset of signal categories, and each parity bit generator is arranged to receive one signal from said subset of signal categories and one or more signals from signal categories outside said subset of signal categories. This provides a particular effective mechanism for increasing error coverage, allowing the error checking mechanism to detect almost all situations where the first output data and the redundant output data differ. In one particular embodiment it has been found that such an approach can give an area coverage of at least 97.4%.

The techniques of the described embodiments can also be used in situations where the two processing circuits do not operate in cycle-by-cycle lockstep. For example, in one embodiment the first and second processing circuits may be arranged to operate in a coarse-grained lockstep. By such an approach, multiple cycles of execution may be performed by both the first and second processing circuits, between the times at which outputs from those two circuits are to be compared. The output data used in such situations can take a variety of forms, but in one embodiment the first output data comprises a block of architectural state information output by the first processing circuitry in response to a checkpointing trigger and the error checking circuitry is arranged to perform the error checking operation using, as the redundant output data, a block of redundant architectural state information output by the second processing circuitry in response to the checkpointing trigger arising within the second processing circuitry. Hence, the techniques of the described embodiments can be used in this instance to periodically check equivalence between the architectural state information output by the first processing circuitry and the corresponding architectural state information output by the second processing circuitry, and to flag situations where those blocks of architectural state information differ.

In one embodiment, operation of the second processing circuitry trails behind operation of the first processing circuitry, and the error code generation circuitry is arranged to generate the error code before the redundant output data is available to the error checking circuitry.

In one embodiment, a storage device may be provided to store the block of architectural state information output by the first processing circuitry in response to the checkpointing trigger. The error code generation circuitry may then in one embodiment be arranged to store the generated error code within the storage device in association with the block of architectural state information. By such an approach, the storage device can operate as an error protected storage device, in that the error code could later be used to check whether any errors have been introduced into the architectural state information whilst it has been stored in the storage device.

However, in addition, the error code can also be used to implement the error checking functionality of the above described embodiments, with reference to the redundant output data. In particular, the second processing circuitry can be arranged to be responsive to the checkpointing trigger to output the block of redundant architectural state information and to initiate a read of the error code from the storage device so as to enable the error checking circuitry to perform the error checking operation. This provides a particular efficient implementation in that existing error checking circuitry that may already be in place in association with the storage device can be used to perform a relatively free hardware comparison of the checkpointed architectural state of the two processors, by using the error code generated from the block of architectural state information output by the first processing circuit to perform an error checking operation on the block of redundant architectural state information output by the second processing circuit.

The error code used for the above purpose can take a variety of forms, but in one embodiment is an error correction code (ECC).

In one embodiment the apparatus may further comprise a storage element to store a pointer value used to determine a location within the storage device in which to store the block of architectural state information. This for example enables a specific area within the storage device to be reserved for the storing of blocks of architectural state information.

In one embodiment, the first processing circuitry may be arranged to output a block of architectural state information each time the checkpointing trigger is encountered during execution of the sequence of instructions. The apparatus may further comprise a counter to maintain an indication of a number of pending blocks of architectural state information stored in the storage device, the pending blocks being those blocks for which the error checking circuitry has yet to perform an error checking operation using the associated error code. The counter may be used in combination with the storage element to determine the location within the storage device to store each new block of architectural state information output by the first processing circuitry, and to determine the location from which to read the error code when performing the error checking operation for each block of redundant architectural state information output by the second processing circuitry.

Hence, by such an approach multiple items of pending architectural state information may be retained, along with associated error codes, to allow later performance of the error checking operation for each corresponding block of redundant architectural state information output by the second processing circuitry.

The checkpointing trigger can take a variety of forms, but in one embodiment comprises execution of a checkpoint instruction within the instruction sequence, processing performed on execution of the checkpoint instruction being dependent on whether the checkpoint instruction is executed by the first processing circuitry or is executed by the second processing circuitry. Hence, the sequence of instructions can include one or more instances of the checkpoint instruction, and each time the checkpoint instruction is executed by the first processing circuit or the second processing circuit, the sequence of steps performed will be dependent on whether it is the first processing circuit executing the checkpoint instruction or the second processing circuit.

In one particular embodiment, on executing the checkpoint instruction within the first processing circuitry, the first processing circuitry is arranged to cause the block of architectural state information to be stored within the storage device in association with the error code generated by the error code generation circuitry. However, on executing the checkpoint instruction within the second processing circuitry, the second processing circuitry is arranged to cause the error code to be read from the storage device and to be provided to the error checking circuitry along with the block of redundant architectural state information to enable the error checking circuitry to perform the error checking operation. By such an approach, it will be seen that execution of the checkpoint instruction by the second processing circuitry effectively results in the performance of a "virtual store"

operation, in that an address within the storage device is determined, but that information is used to read the error code information stored at that address without storing to that address the block of redundant architectural state information. Instead, the read error code is provided to the error checking circuitry along with the block of redundant architectural state information output from the second processing circuitry, to allow the error checking operation to be performed.

Further, in one embodiment, execution of the checkpoint instruction within the second processing circuitry causes the second processing circuitry to output the content of multiple architectural registers for storage in a buffer as the redundant architectural state information for input to the error checking circuitry. Hence, the checkpoint instruction can be viewed as a variant of a store multiple instruction, that identifies multiple architectural registers whose contents are to be output, the content of those registers being then stored in a buffer to form a block of information to be subjected to the error checking operation using the error code retrieved from the storage device. This can improve performance by enabling checking of multiple register contents at the same time.

In one embodiment, the amount of information stored in the buffer will correspond to the amount of information stored in an entry of the storage device in association with the error code. As a very specific example, it may be that each entry in the storage device stores 128 bits of data, and has a 9-bit ECC associated with it. The output of four 32-bit architectural registers can then be output into a 128-bit buffer, which can then be used as an input to the error checking circuitry along with the 9-bit ECC retrieved from the storage device.

Particular embodiments will now be described with reference to the Figures.

FIG. 1 is a block diagram of an apparatus in accordance with one embodiment. First and second processing circuits 10, 20 are provided that are both arranged to execute the same sequence of instructions, typically using the same input data. The first processing circuit 10 may be considered to be a main processor, whose output can be propagated on for subsequent processing, as indicated by the dotted line 15. In contrast, the second processing circuit can be viewed as being a redundant processor whose output forms redundant output data to be checked against the first output data from the first processing circuit 10. Such an approach can provide for enhanced error detection, by enabling situations to be detected where the first output data differs from the redundant output data. For example, faults caused by radiation or other external events may cause single event upsets that may manifest in errors in the output data from one of the processing circuits. To eliminate common-cause faults, one of the processing circuits can have its operation delayed by a number of cycles relative to the other, it typically being considered appropriate to delay the redundant processing circuit's operation so as not to impact performance of the main processing circuit.

To avoid the need to buffer the first output data from the first processing circuit until such time as the corresponding redundant output data is available for checking, the embodiments described herein generate an error code from the first output data, and then use that error code to perform an error checking operation on the redundant output data, so as to effectively perform an implicit check between the first output data and the redundant output data, but without needing to directly compare the first output data with the redundant output data. This can provide significant efficiency gains for a number of reasons. Firstly, the error code typically would be far more compact than the first output data, and accordingly any buffering of the error code required whilst waiting for the redundant output data to be available will involve less buffering circuitry, giving rise to area and energy consumption improvements. Further, the error checking circuitry will be significantly less complex than checking circuitry that would be required to compare each output signal of the first and second processing circuits, hence providing further efficiency benefits.

Hence, as shown in FIG. 1, error code generation circuitry 30 is provided, that receives the first output data from the first processing circuit, and generates an error code which is then buffered in the storage 40 for later reference by error checking circuitry 50. The error code generated by the error code generation circuitry 30 can take a variety of forms, and may for example depend on how the first and second processing circuits are being used, the nature of their output data that is being compared, etc. The error code could for example be as simple as a single parity bit, or alternatively may comprise a set of parity bits, a SECDED (Single Error Correct, Double Error Detect) code, or an even stronger error code to achieve a desired error detection coverage. In other embodiments, for example where the number of bits in the output data is relatively small, an error correction code (ECC) may be suitable as the error code.

Once the redundant output data is available from the second processing circuitry, the error checking circuitry receives the error code from the storage 40, and performs an error checking operation. Essentially, the error checking operation can be the same as would be performed had the error code previously been generated directly from the redundant output data, and hence were being used to identify whether any subsequent errors have been introduced into the redundant output data since the error code was generated. However, it will be noted that in this case the error code was not generated using the redundant output data, but instead was generated using entirely separate data, namely the first output data generated by the first processing circuit 10. Hence, the error checking circuitry 50 is here being used to evaluate the redundant output data that has come from an independent source to the source of the data that was used to generate the error code. Nevertheless, due to the nature of the redundant execution being performed by the second processing circuitry, there is an expectation that, in the absence of errors, the first output data will correspond with the redundant output data, and hence the error code generated using the first output data can be used to perform an error checking operation on the redundant output data. When that error checking operation detects an error, this can be interpreted as meaning that the first output data differs from the redundant output data, and a comparison indication signal can be output by the error checking circuitry 50 to indicate that the outputs of the two processors differ. Hence, the error checking operation enables an implicit check to be performed between the first output data and the redundant output data, without needing to retain the first output data for that purpose.

If the error checking operation does not detect an error, then in one embodiment the error checking circuitry 50 outputs a comparison indication signal to indicate that the first output data is considered to be the same as the redundant output data. It should be noted that it cannot typically be guaranteed that the first output data is the same as the redundant output data in such situations, since the error code will not typically be unique to one specific arrangement of output data, and accordingly it is possible that the first output data could differ from the redundant output data without the error checking operation detecting that difference. However, as will be discussed in detail with reference to the remaining embodiments, it has been found that in many situations an error code can be generated that involves significantly less bits than the original output data, and which can still allow the vast majority of all error situations to be detected. In particular, the error coverage can be high enough to meet the requirements of many modern redundant execution based systems.

In one embodiment, the error code generation circuitry 30 and the error checking circuitry 50 may be components provided separately to the first and second processing circuits 10, 20. However, in an alternative embodiment, that functionality can be incorporated within the first and second processing circuits. For example, when the first and second processing circuits are arranged to operate in a coarse-grained lockstep, the error code generation circuitry 30 may form part of the first processing circuitry 10, whilst the error checking circuitry 50 may form part of the second processing circuitry 20.

The first and second processing circuits may be arranged to operate with respect to each other in a number of different ways, and the output data produced by each of those processing circuits for comparison can also vary dependent on embodiment. In one particular embodiment, the first and second processing circuits operate in a dual core lockstep (DCLS) arrangement, so as to operate in cycle-by-cycle lockstep, with in one embodiment all of the output signals from both processing circuits being compared after each cycle of operation. Such an arrangement is shown schematically in FIG. 2. Here the main CPU 100 operates in cycle-by-cycle lockstep with the redundant CPU 110, with the operation of the redundant CPU 110 being delayed by two cycles through use of the delay elements 115, 120. By delaying the redundant CPU by two cycles, this can eliminate common-cause faults that might manifest in the same errors in the outputs from the two CPUs.

Figure 2:
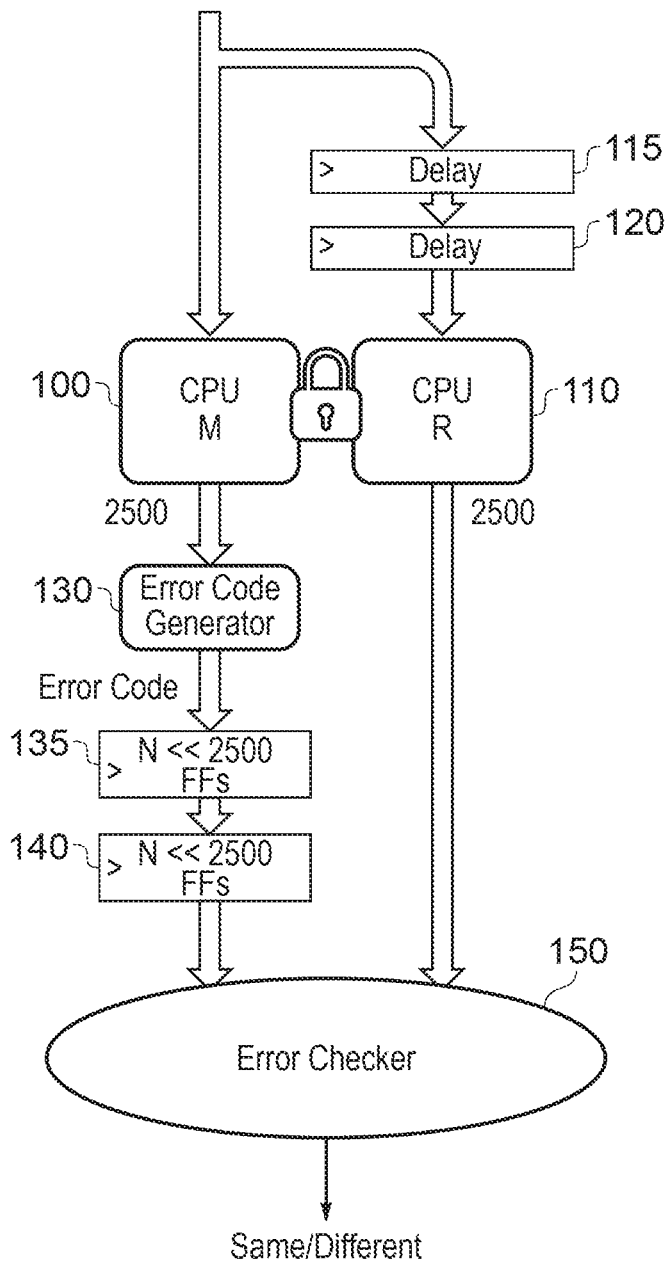
FIG. 2 schematically illustrates the operation of an apparatus in accordance with one embodiment.

The number of signals forming the first output data from the CPU 100 and the corresponding redundant output data from the CPU 110 can vary dependent on embodiment, but in the example illustrated in FIG. 2 it is assumed that of the order of 2500 signals are included in the respective outputs of the main and redundant CPUs 100, 110.

After each cycle, the error code generator 130 receives the output data from the main CPU and generates an error code from that output data. In the embodiments described herein, it is assumed that the error code consists of significantly less than 2500 bits of information, and hence it is much more efficient to buffer the generated error code than to have to buffer the entire first output data from the CPU 100 purely for the purpose of allowing a later check against the corresponding block of output data from the redundant CPU 110.

Instead, as shown, the error code is generated immediately, and then buffered for two cycles via the delay elements 135, 140, so that it can then be provided to the error checking circuitry 150 in association with the corresponding block of output data from the redundant CPU 110. The error checking circuitry will then perform an error checking operation using the error code and the redundant output data. If an error is detected, then it will generate a comparison indication signal to indicate that the first output data from the main CPU 100 differs from the redundant output data from the redundant CPU 110, and this can then be used to trigger an appropriate action. The appropriate action can take a variety of forms, but may for example involve restoring processing of both CPUs to an earlier checkpoint, and then beginning to rerun the code from that checkpoint. That previous checkpoint will represent a point in time where the architectural states of the two CPUs 100, 110 were correct and exactly the same.

However, if the error checker does not detect any error, then it will be assumed that the output from the main CPU 100 is the same as the output from the redundant CPU 110, and processing will continue.

The error code generated by the error code generator 130 can take a variety of forms. It could for example be as simple as a single parity bit, but in one embodiment comprises a set of parity bits. In an alternative embodiment, a SECDED code could be produced. For example, a 13-bit SECDED code may be sufficient for about 2500-bit output data.

Figure 3:
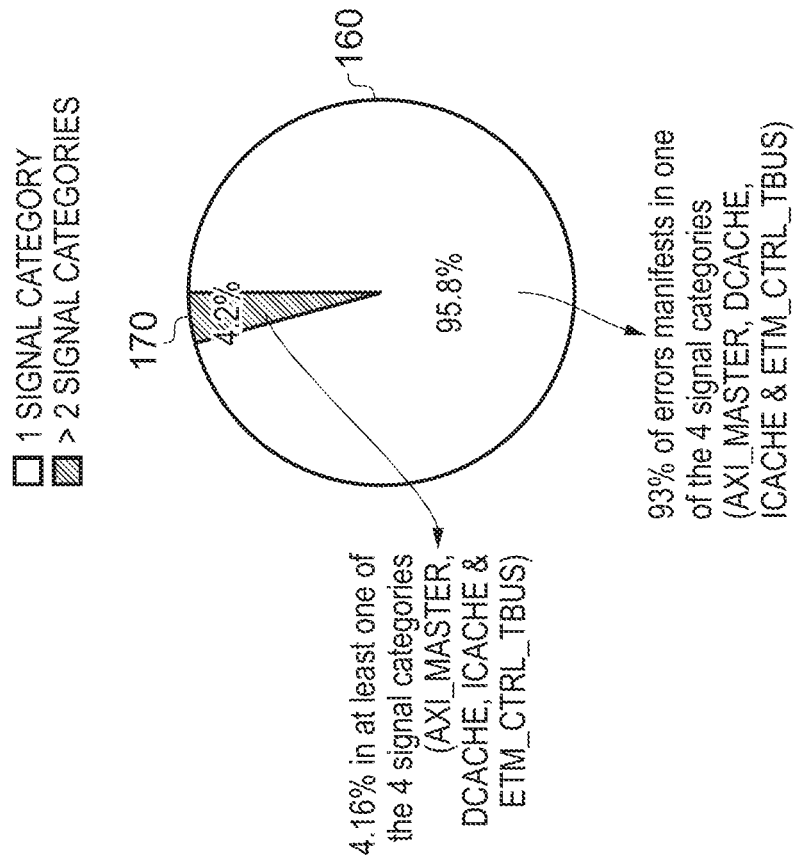
FIG. 3 illustrates, for a particular example implementation, how the majority of errors manifest themselves in particular signal categories.

As mentioned earlier, when an error is not detected by the error checker, this will not unequivocally mean that the output from the two CPUs is guaranteed to be the same. This is because a soft error in the CPU may have multiple signals differing at the CPU outputs, and the error code will not be unique for every possible variant of output signal. However, it has been found that in many embodiments, by appropriate organisation of the error code generator, a very high error coverage can be achieved. This is illustrated by way of a specific example with reference to FIG. 3. In particular, in this example the plurality of signals forming the output data were grouped into multiple signal categories, some of which are indicated in the table of FIG. 3. The table also indicates the number of bits associated with each signal category. In this particular example the CPU outputs 2481 signals, and the signals actually belong to 22 different categories, but from a single-event upset fault injection study it was found that only 13 of those signal categories (i.e. the ones shown in the table of FIG. 3) have signals that differ when a soft error occurs, for multiple benchmark studies. This is equivalent to the 2005 signals identified in the table of FIG. 3. The signals within each of the signal categories identified in the table of FIG. 3 are as follows:

AXI_MASTER (AXI Master Bus Data, Address and Control signals)
AXI_PP (AXI Peripheral Bus Data, Address and Control signals)
CLKS_RSTS (Clock control and reset signals)
D0TCM/D1TCM (TCM Memory Data, Address and Control signals)
DBG (Debug control signals)
DCACHE (Dcache Data, Address and Control signals)
ETM_CTRL_TBUS (Embedded Trace Memory Control Bus signals)
ETM_OTHER (Embedded Trace Memory other signals)
ICACHE (Icache Data, Address and Control signals)
ITCM (ITCM Memory Data, Address and Control signals)
STATUS_CTRL (Misc. control signals)
DFT (Design for Testability signals)

As shown by the pie chart in FIG. 3, it was observed that 95.8% of the errors detected by the checker (as indicated by the section 160) manifest in only one signal category and in fact 93% of the errors manifest in one of four signal categories, namely the AXI_MASTER, DECACHE, ICACHE and ETM_CTRL_TBUS categories. The remaining 4.2% of the errors detected by the checker manifest in multiple categories (as indicated by the section 170), but 4.16% are in at least one of the same four signal categories as mentioned above.

Accordingly, the inventors observed that if the error code generator 130 were configured so as to isolate the signals from the four main categories, this can be used to guarantee an error coverage of at least 97.4%.

Figure 4:
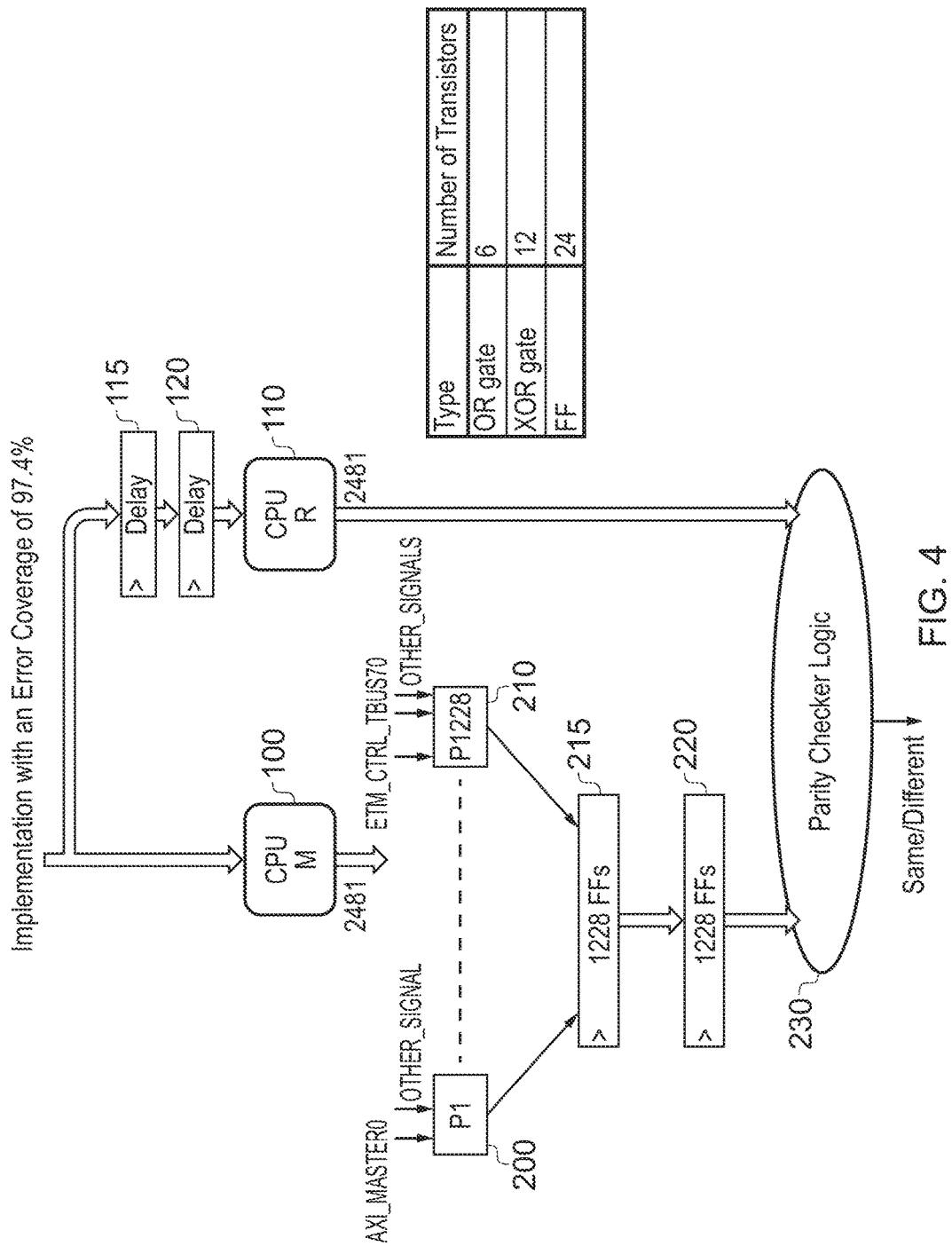
FIG. 4 schematically illustrates one particular implementation of error code generation circuitry and error checking circuitry in accordance with one embodiment.

As will be apparent from the table in FIG. 3, the total number of signals in the four identified categories is 1228. FIG. 4 illustrates an example arrangement of the error code generator 130 that can be used to provide an isolation of those 1228 signals. In particular, as shown in FIG. 4, the error code generator 130 takes the form of 1228 parity bit generators 200, 210, each of which receive multiple input signals, and generate a single bit output. In one embodiment, each parity bit generator 200, 210 receives two or three inputs, where one input is a signal from one of the above four main signal categories, and any remaining inputs are signals from other categories. As a result, each parity bit generator only receives one signal from the four main signal category groups, hence isolating those signals.

As a result, the error code comprises 1228 bits which are then buffered by the flip-flops 215, 220 for two cycles, before being input to the error checker circuitry, which in this case takes the form of parity checker logic 230 that also receives the 2481 bits of redundant output data from the redundant CPU 110. Using the 1228 parity bits the parity checker logic can hence perform a parity checking operation on the redundant data from the CPU 110 and, in the event of an error being detected, can produce a comparison indication signal indicating that the output from the main CPU 100 differs from the output from the redundant CPU 110. Otherwise, in the absence of an error being detected, the parity checker output will indicate that the outputs from both CPUs are considered to be the same.

In this specific example the table shown in FIG. 4 indicates the number of transistors associated with certain types of logic gate that will be used to implement the 1228 parity generators from 200 to 210, the flip flops 215, 220 and the parity checker logic 230. With such an arrangement, it has been found that a 32% reduction in area can be achieved when compared with an implementation that seeks to directly compare the outputs from the two CPUs 100, 110 in order to detect when those outputs differ. Hence, in this particular example, an error coverage of at least 97.4% can be achieved whilst obtaining a 32% reduction in area. Error coverage of at least 97.4% is sufficient to meet a number of Standards associated with redundantly executing processors.

Figure 5:
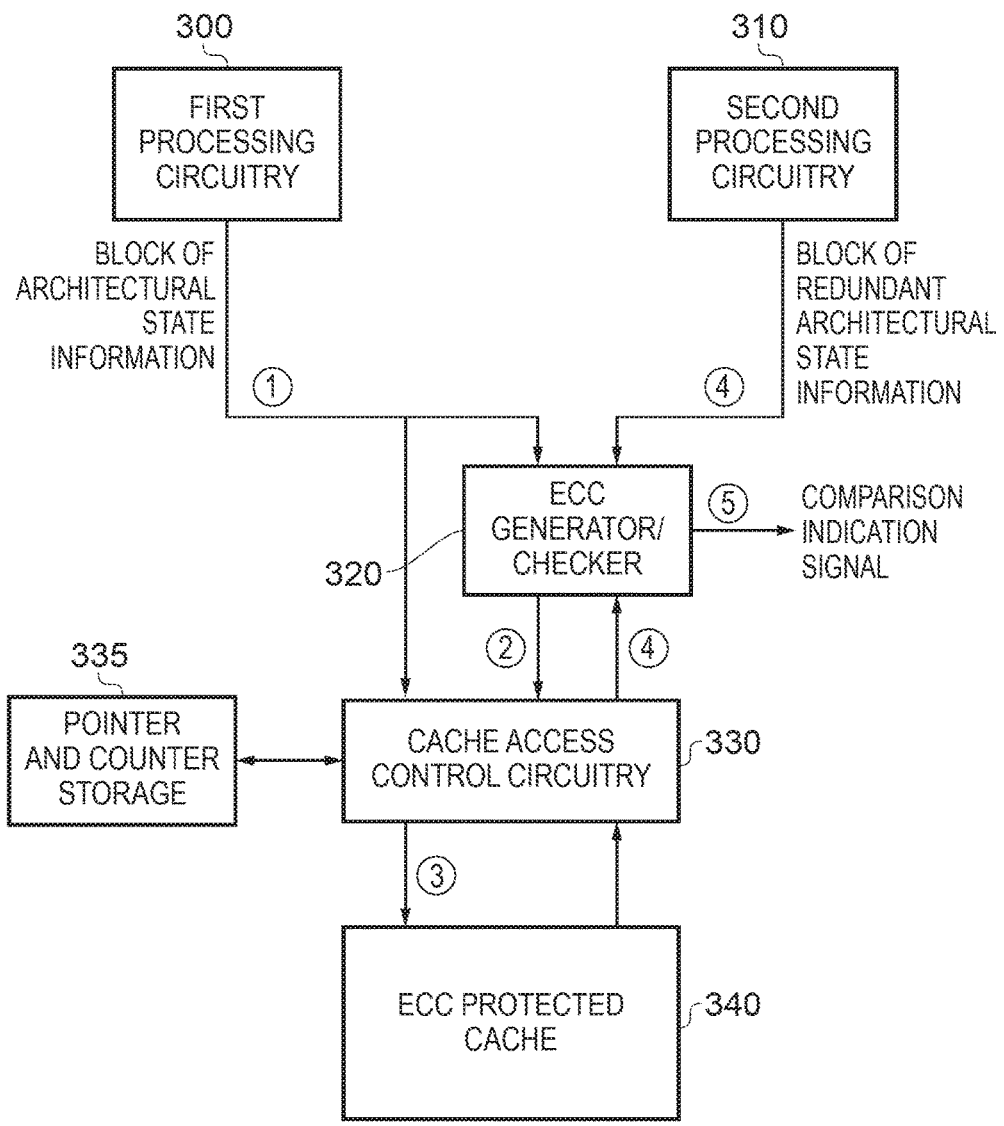
FIG. 5 schematically illustrates an apparatus in accordance with an alternative embodiment.

FIG. 5 illustrates another example embodiment where the first and second processing circuits operate in a coarse-grained lockstep. In such an application, the techniques of the described embodiments can be used to perform an architectural state comparison during checkpointing operations that occur whilst instructions are being executed on the first and second processing circuits 300, 310. In particular, each of the first and second processing circuits 300, 310 will typically execute the same sequence of instructions, using the same input data, but execution on the redundant processor, which in this case is assumed to be the second processing circuit 310, trails behind that of the main processing circuit, which is considered to be the first processing circuitry 300. The first and second processing circuits can be homogeneous or heterogeneous processor cores, which are arranged on occurrence of a checkpoint trigger to output a block of architectural state information. The checkpoint trigger can arise in a variety of ways, but in one embodiment the sequence of instructions include checkpoint instructions, and execution of those checkpoint instructions trigger the checkpointing operation.

Figure 7:
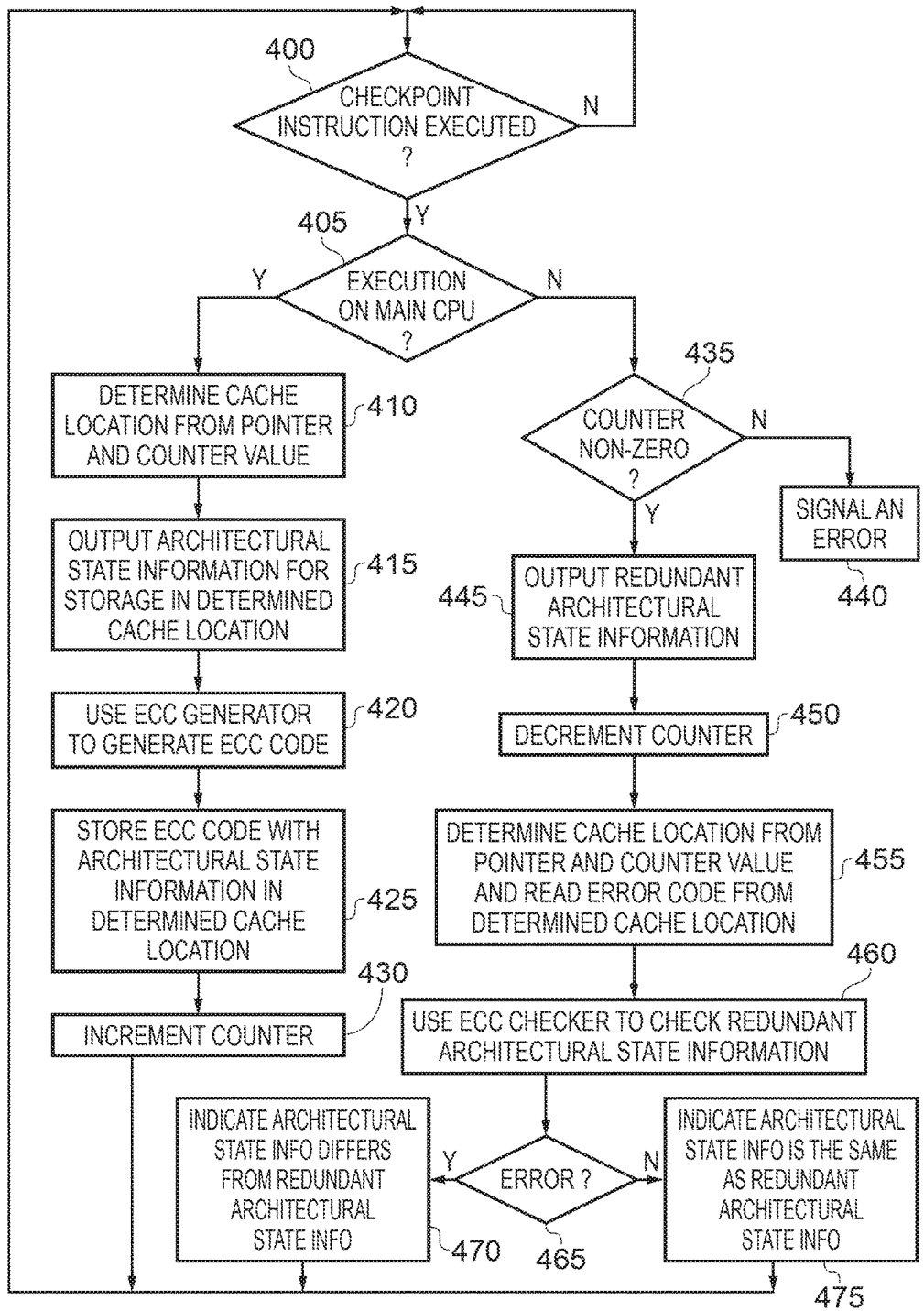
FIG. 7 is a flow diagram illustrating the operation of the circuitry of FIG. 5 in accordance with one embodiment.

As shown in FIG. 5, both the first and second processing circuits are assumed to have access to an ECC protected cache 340, whose access is controlled by cache access control circuitry 330. When the first processing circuit reaches a checkpoint trigger, it outputs a block of architectural state information, that is forwarded to the cache access control circuitry 330 for storage within an entry of the ECC protected cache 340. As will be discussed in more detail with reference to FIG. 7, pointer and counter storage 335 is used to store a pointer to a base entry in the ECC protected cache, and to maintain a counter indication indicating the number of pending blocks of architectural state information which are stored in the ECC protected cache, and for which a check operation is yet to be performed.

The storage 335 can take a variety of different forms. For example, the pointer can be stored in a special register to identify the cache address of the first checkpoint. Successive checkpoints will then increment this address by an offset (for example equivalent to the size of a block of checkpointed architectural state data), and then a separate register can keep a counter value to track the number of pending blocks of checkpointed architectural state data. The number of checkpoints that are allowed to be kept concurrently may be implementation dependent.

Each block of architectural state information output by the first processing circuitry is also routed to the ECC generator/checker circuitry 320, to allow an ECC to be generated in association with the block of architectural state information. The cache access control circuitry then causes the block of architectural state information to be stored in an entry of the ECC protected cache 340 that is identified using the pointer and counter information in the storage 335, that entry also being used to store the associated ECC generated by the circuitry 320.

Each time the second processing circuitry 310 reaches a checkpoint trigger, it also outputs a block of redundant architectural state information, and this is forwarded to the ECC generator/checker circuitry 320 to cause an ECC check operation to be performed. However, that block of redundant architectural state information is not stored in the ECC protected cache, nor is an ECC generated for that block of redundant architectural state information. Instead, the cache access control circuitry 330 is used to retrieve from the relevant entry in the ECC protected cache 340 the ECC that was generated for the corresponding block of architectural state information output by the first processing circuitry 300, with that ECC being returned to the ECC checker circuitry 320. The ECC checker circuitry then performs an error checking operation using the retrieved ECC from the cache, and the block of redundant architectural state information output by the second processing circuitry, and as a result of that checking operation outputs a comparison indication signal. As with the earlier described embodiments, in the event of an error being detected by the checker circuitry, the comparison indication signal will indicate that the outputs from the two processing circuits differ, but will otherwise indicate that those outputs are considered to be the same.

Whilst in FIG. 5 a number of the components are shown as shared by the first and second processing circuits 300, 310, some functionality may be replicated within both processing circuits. For example, in some embodiments the components 320, 330 may be replicated for each processor.

Whilst in FIG. 5 an ECC protected cache is used, it will be appreciated that in other embodiments storage other than a cache might be used for the same purpose. For example, a tightly coupled memory (TCM) may be used as an ECC protected storage device for storing of the blocks of architectural state information and associated ECCs. A TCM may also be referred to as scratchpad memory.

Figure 6:
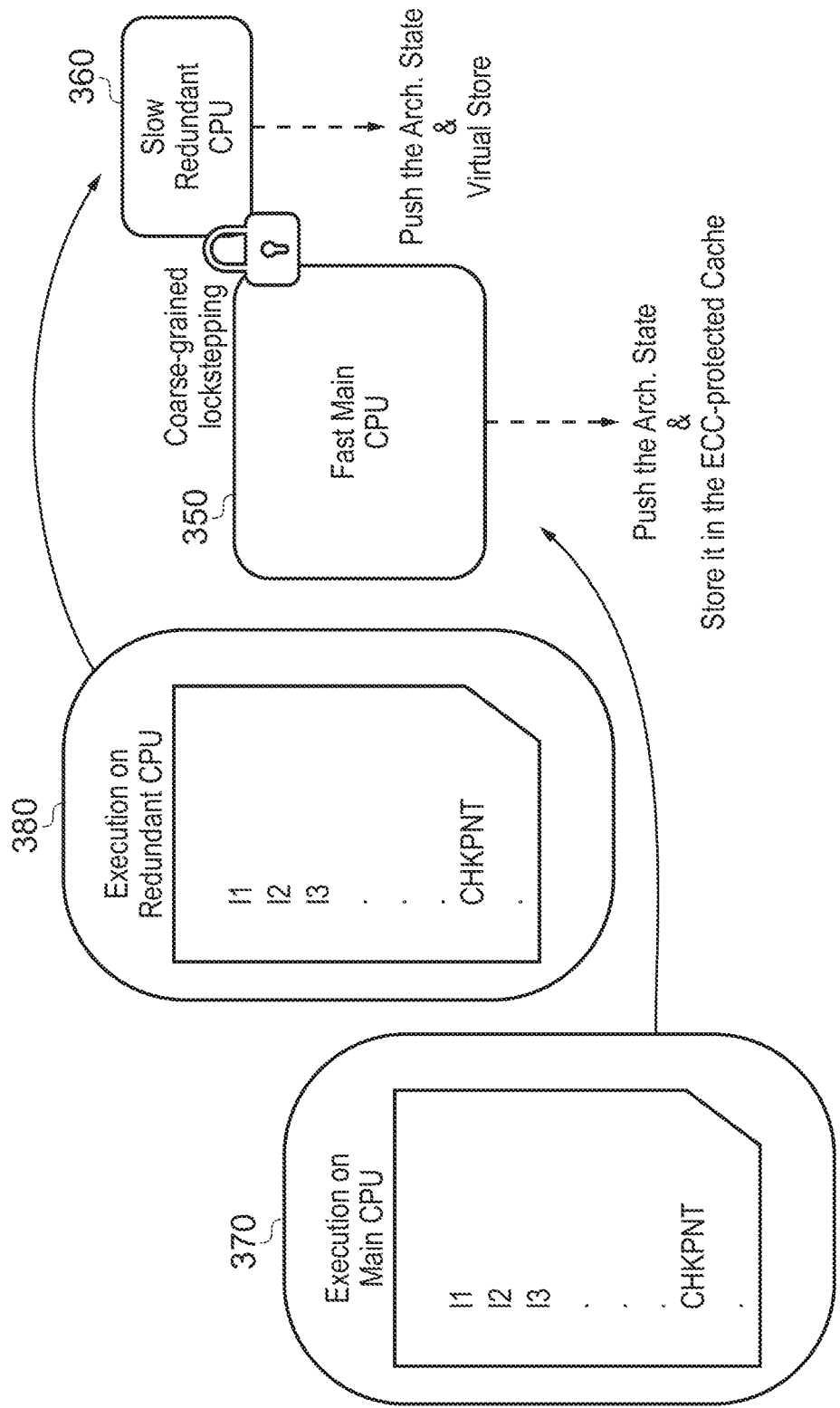
FIG. 6 illustrates how the execution of instructions on the second processing circuitry of FIG. 5 trails the execution of instructions on the first processing circuitry in accordance with one embodiment.

FIG. 6 schematically illustrates the coarse-grained lockstep operation of the main CPU and the redundant CPU. In this instance, it is assumed that the main CPU is a fast CPU 350 and the redundant CPU is a slower CPU 360. As mentioned earlier, in accordance with the coarse-grained lockstep approach, the CPUs do not need to remain in cycle-by-cycle lockstep, but instead at certain checkpoint trigger events, the architectural state of both CPUs is output so that it can be compared by the checking circuitry. The schematic 370 illustrates the execution of a sequence of instructions on the main CPU, whilst the schematic 380 illustrates the execution of the same set of instructions on the redundant CPU. In this embodiment, each checkpoint trigger is initiated by execution of a checkpoint instruction within the instruction sequence.

When a checkpoint instruction is executed by the main CPU, it pushes out the architectural state for storing in the ECC protected cache, as discussed earlier with reference to FIG. 5. However, when the redundant CPU 360 executes the corresponding checkpoint instruction, whilst it also pushes out the block of architectural state information, it does not cause that information to be stored in the ECC protected cache, but instead performs a "virtual store" style of operation. In particular, an address is identified within the ECC protected cache, using the pointer and counter information in the storage 335, but the block of architectural state information output from the redundant CPU is not stored there. Instead, that address is used to identify the ECC that should be retrieved and provided to the checker circuitry 320, a check operation is then performed using the retrieved ECC and the output block of redundant architectural state information. This process is discussed in more detail with reference to the flow diagram of FIG. 7.

At step 400, it is determined whether a checkpoint instruction has been executed. When it has, at step 405 it is determined whether the instruction has been executed on the main CPU. If it has, then the process proceeds to step 410, where a cache location is determined using the pointer and counter information in the storage 335. As discussed earlier, the pointer identifies a base entry within the cache, whilst the counter value may in one embodiment be initiated at a zero value, and then incremented each time a block of architectural state information is stored in the cache. As will be discussed later, the counter will be decremented each time a check operation is performed with reference to a corresponding block of architectural state information. Hence, when there are multiple pending blocks of architectural state information that are awaiting performance of a check operation, those separate blocks of architectural state information will be stored in different locations within the cache using the pointer and the counter value.

Following determination of the cache location at step 410, the architectural state information is output for storage in the determined cache location at step 415, and at step 420 the ECC generator 320 is used to generate an associated ECC code. As a result, at step 425, the ECC code is stored with the block of architectural state information in the determined cache location. Thereafter, at step 430 the counter is then incremented.

Each time a checkpoint instruction is executed on the redundant CPU, the "No" branch from step 405 will be followed, and at step 435 it will be determined whether the counter is non-zero. If the counter is zero, this indicates an unlikely scenario has occurred where the trailing core has passed the leading core. This is an error situation, and in one embodiment is flagged immediately by signalling an error at step 440. In particular, something erroneous is likely to have happened in the leading core that has stopped it progressing. However, assuming the counter is non-zero, then the process proceeds to step 445 where the redundant architectural state information is output. The counter is decremented at step 450, and then a cache location is determined from the pointer and the decremented counter value, in order to identify an entry whose error code (ECC) should then be read (see step 455). Once the ECC has been retrieved from the identified entry, then the ECC checker is used at step 460 to check the redundant architectural state information using the retrieved ECC. It is then determined at step 465 whether an error has been detected. If so, then at step 470 the checker outputs a comparison indication signal to indicate that the architectural state information output by the main CPU differs from the redundant architectural state information output by the redundant CPU. Conversely, if no error is detected, then at step 475 the checker outputs a comparison indication signal to indicate that the architectural state information output by the main CPU is considered to be the same as the redundant architectural state information output from the redundant CPU. The process then returns to step 400.

Figure 8:
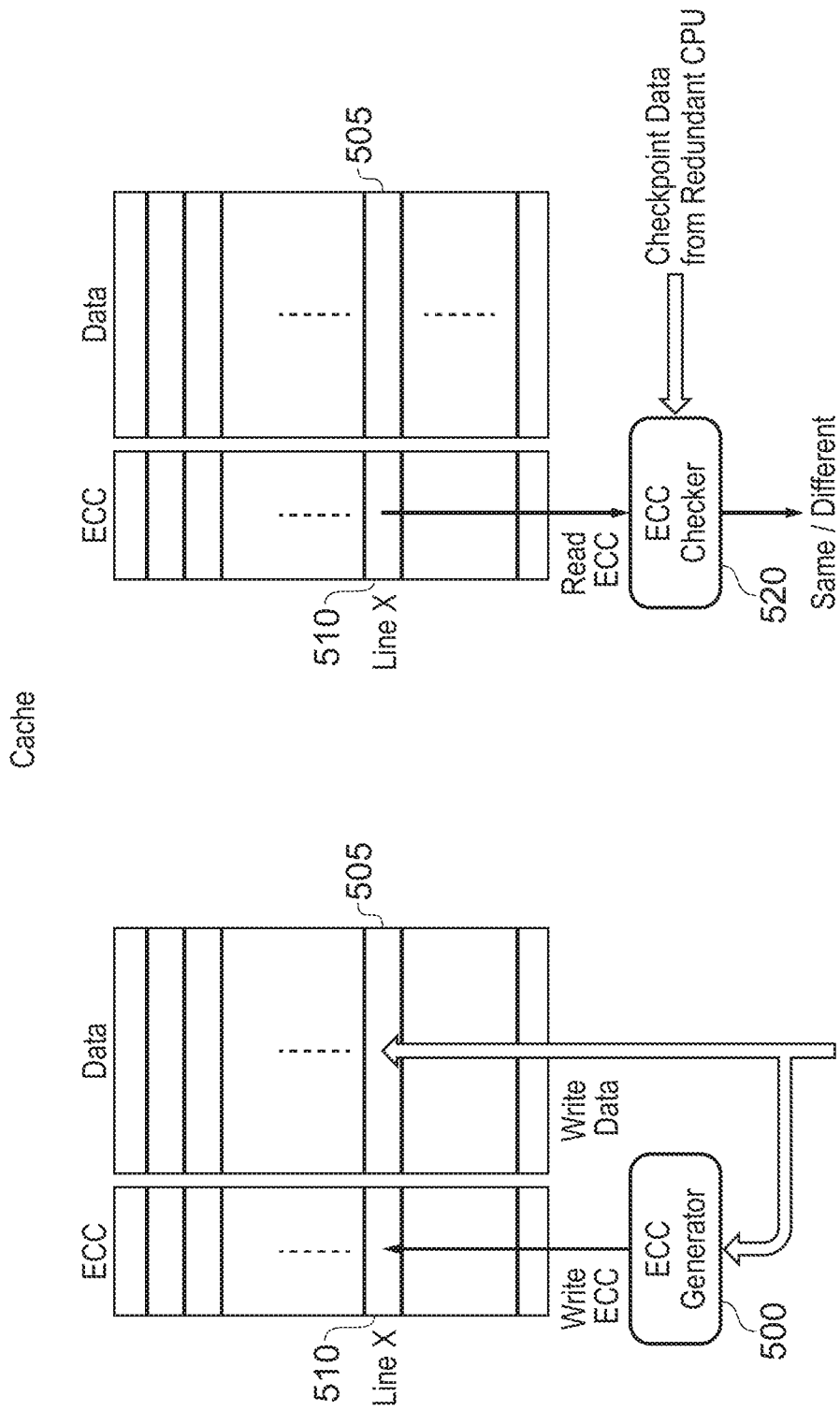
FIGS. 8A and 8B illustrate how the ECC protected cache of FIG. 5 is referenced by the ECC generator and the ECC checker in accordance with one embodiment.

FIGS. 8A and 8B schematically illustrate the ECC generation and ECC checking operations performed when implementing the above checkpointing scheme. As shown in FIG. 8A, when the checkpoint data (i.e. the block of architectural state information) is output from the main CPU, it will be stored within an entry 505 within the ECC protected cache, and the ECC generator 500 will generate an associated ECC that is stored in the entry 510 in association with the block of architectural state information. The entries 505, 510 may in one embodiment correspond to a particular cache line within the ECC protected cache.

As shown in FIG. 8B, when the checkpoint data (the block of redundant architectural state information) is available from the redundant CPU, this is passed to the ECC checker, and causes the ECC checker 520 to read the ECC from the relevant line in the ECC protected cache, in order to enable an error checking operation to then be performed in respect of the block of redundant architectural state information, in order to produce an output indicating whether the architectural state information of the main CPU is considered to be the same or different to the redundant architectural state information output by the redundant CPU.

Figure 9:
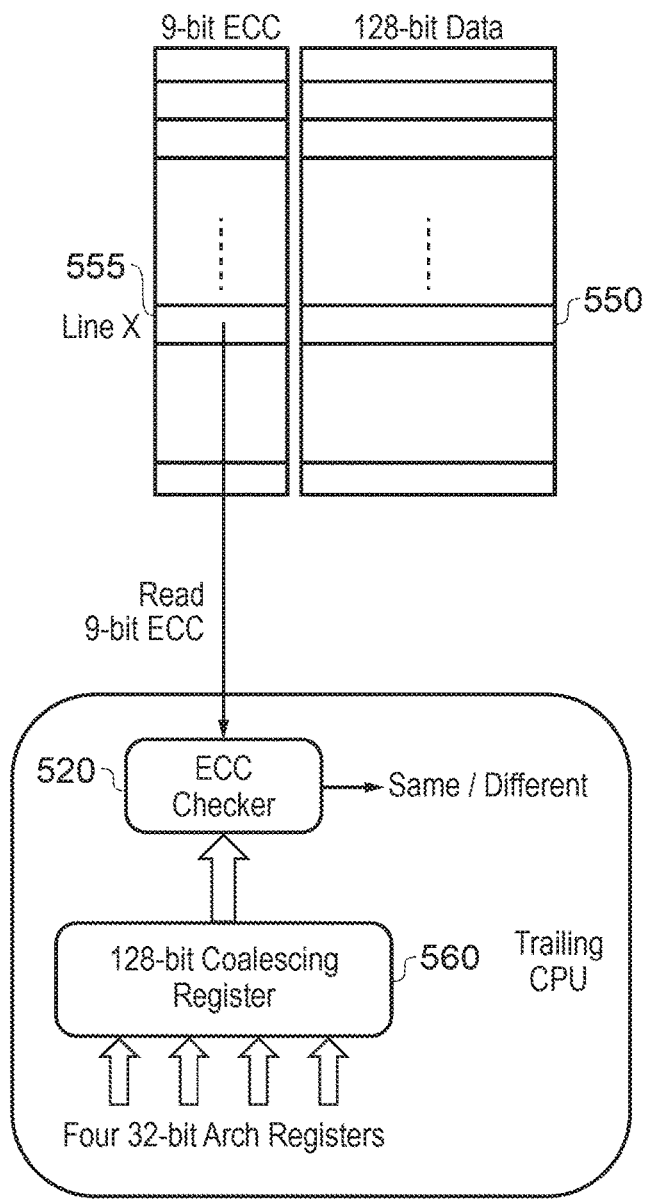
FIG. 9 illustrates how a coalescing register can be used to allow ECC checking in a single cycle in accordance with one embodiment.

An advantage of the above described scheme is that it may use an existing ECC checker already in place to perform a relatively free hardware comparison of the checkpoint's architectural state of the two cores. Another advantage is that the ECC checker can compare wider data bits. For example, if 9-bit ECC is used to protect 128-bits of data in a cache line, as illustrated in the example of FIG. 9, then when the virtual store operation is triggered within the redundant CPU on executing the checkpoint instruction, this will cause only the 9-bit of ECC code to be read from the relevant cache line, and for this to be read into the ECC checker to make the implicit comparison with the block of redundant architectural state information. The checkpoint instruction can effectively be a variant of a store multiple instruction, so that multiple architectural registers can have their contents output and coalesced into a data buffer 560 prior to the contents of that buffer then being provided to the ECC checker. For example, if the architectural registers are 32-bits in size, the contents of four architectural registers can be coalesced into a 128-bit coalescing register 560, so that the ECC checker can then perform an implicit comparison in a single cycle using the 9-bit ECC. This can provide further efficiency benefits when comparing the architectural state.

It will be appreciated that the above described embodiments provide a particularly efficient mechanism for checking output data during redundant execution of instructions.

Rather than needing to directly check the outputs from two processing circuits, an error code can be generated from the output of the first processing circuit, and then used to perform an error checking operation on the output from the second processing circuit, in order to provide an implicit comparison of the two outputs. This can give rise to significant efficiency benefits, reducing area and energy consumption, whilst also enabling performance improvements to be obtained.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    first processing circuitry to execute a sequence of instructions;
    second processing circuitry to redundantly execute the sequence of instructions;
    error code generation circuitry to generate an error code from first output data generated by the first processing circuitry; and
    error checking circuitry to use the error code to perform an error checking operation on redundant output data from the second processing circuitry, and to generate a comparison indication signal to indicate that the first output data differs from the redundant output data when the error checking operation detects an error.

2. An apparatus as claimed in claim 1, wherein the error checking circuitry is arranged to generate the comparison indication signal to indicate that the first output data is considered to be the same as the redundant output data when the error checking operation detects no error.

3. An apparatus as claimed in claim 1, wherein operation of the second processing circuitry is delayed relative to operation of the first processing circuitry, and the error code generation circuitry is arranged to generate the error code one or more clock cycles before the redundant output data is available to the error checking circuitry, thereby enabling the comparison indication signal to be generated without needing to buffer the first output data for said one or more clock cycles.

4. An apparatus as claimed in claim 3, further comprising storage to temporarily store the error code until the error checking circuitry performs the error checking operation.

5. An apparatus as claimed in claim 1, wherein the first processing circuitry and the second processing circuitry are arranged to operate in cycle-by-cycle lockstep, and for each clock cycle for which the second processing circuitry produces redundant output data the error checking circuitry is arranged to perform the error checking operation on said redundant output data using the error code generated from corresponding first output data from the first processing circuitry.

6. An apparatus as claimed in claim 5, wherein operation of the second processing circuitry is delayed by one or more cycles relative to operation of the first processing circuitry.

7. An apparatus as claimed in claim 1, wherein:
    the first output data comprises a plurality of signals grouped into multiple signal categories, the multiple signal categories including a subset of signal categories whose signals are more likely to exhibit an error on occurrence of a fault than signals of signal categories outside said subset; and
    the error code generation circuitry is arranged to isolate the signals from each of the signal categories in said subset of signal categories when generating the error code.

8. An apparatus as claimed in claim 7, wherein the error code generation circuitry comprises a plurality of parity bit generators, each parity bit generator arranged to receive signals of the first output data from more than one signal category that comprises at most one of the subset of signal categories.

9. An apparatus as claimed in claim 8, wherein said plurality of parity bit generators comprises N parity bit generators, where N is the total number of signals in said subset of signal categories, and each parity bit generator is arranged to receive one signal from said subset of signal categories and one or more signals from signal categories outside said subset of signal categories.

10. An apparatus as claimed in claim 1, wherein:
    the first processing circuitry and the second processing circuitry are arranged to operate in coarse-grained lockstep;
    the first output data comprises a block of architectural state information output by the first processing circuitry in response to a checkpointing trigger; and
    the error checking circuitry is arranged to perform the error checking operation using, as the redundant output data, a block of redundant architectural state information output by the second processing circuitry in response to the checkpointing trigger arising within the second processing circuitry.

11. An apparatus as claimed in claim 10, wherein operation of the second processing circuitry trails behind operation of the first processing circuitry, and the error code generation circuitry is arranged to generate the error code before the redundant output data is available to the error checking circuitry.

12. An apparatus as claimed in claim 11, further comprising:
    a storage device to store the block of architectural state information output by the first processing circuitry in response to the checkpointing trigger;
    the error code generation circuitry being arranged to store the generated error code within the storage device in association with the block of architectural state information;
    the second processing circuitry being responsive to the checkpointing trigger to output the block of redundant architectural state information and to initiate a read of the error code from the storage device to enable the error checking circuitry to perform the error checking operation.

13. An apparatus as claimed in claim 12, wherein the error code is an error correction code (ECC).

14. An apparatus as claimed in claim 12, further comprising a storage element to store a pointer value used to determine a location within the storage device in which to store the block of architectural state information.

15. An apparatus as claimed in claim 14, wherein:
the first processing circuitry is arranged to output a block of architectural state information each time the checkpointing trigger is encountered during execution of said sequence of instructions;
the apparatus further comprises a counter to maintain an indication of a number of pending blocks of architectural state information stored in the storage device, the pending blocks being those blocks for which the error checking circuitry has yet to perform an error checking operation using the associated error code;
the counter being used in combination with the storage element to determine the location within the storage device to store each new block of architectural state information output by the first processing circuitry, and to determine the location from which to read the error code when performing the error checking operation for each block of redundant architectural state information output by the second processing circuitry.

16. An apparatus as claimed in claim 10, wherein the checkpointing trigger comprises execution of a checkpoint instruction within the instruction sequence, processing performed on execution of the checkpoint instruction being dependent on whether the checkpoint instruction is executed by the first processing circuitry or is executed by the second processing circuitry.

17. An apparatus as claimed in claim 16, wherein:
on executing the checkpoint instruction within the first processing circuitry, the first processing circuitry is arranged to cause the block of architectural state information to be stored within the storage device in association with the error code generated by the error code generation circuitry; and
on executing the checkpoint instruction within the second processing circuitry, the second processing circuitry is arranged to cause the error code to be read from the storage device and to be provided to the error checking circuitry along with the block of redundant architectural state information to enable the error checking circuitry to perform the error checking operation.

18. An apparatus as claimed in claim 17, wherein execution of the checkpoint instruction within the second processing circuitry causes the second processing circuitry to output the content of multiple architectural registers for storage in a buffer as the redundant architectural state information for input to the error checking circuitry.

19. A method of checking output data during redundant execution of instructions within an apparatus having first processing circuitry to execute a sequence of instructions, and second processing circuitry to redundantly execute the sequence of instructions, the method comprising:
generating an error code from first output data generated by the first processing circuitry;
using the error code to perform an error checking operation on redundant output data from the second processing circuitry; and
generating a comparison indication signal to indicate that the first output data differs from the redundant output data when the error checking operation detects an error.

20. An apparatus comprising:
first processing means for executing a sequence of instructions;
second processing means for redundantly executing the sequence of instructions;
error code generation means for generating an error code from first output data generated by the first processing means; and
error checking means for using the error code to perform an error checking operation on redundant output data from the second processing means, and for generating a comparison indication signal to indicate that the first output data differs from the redundant output data when the error checking operation detects an error.

* * * * *